Patented Dec. 4, 1934

1,983,151

UNITED STATES PATENT OFFICE 1,983,151

COLORING AGENTS FOR GLASS BATCHES AND METHOD OF EMPLOYING SAME

Alexander Silverman, Pittsburgh, Pa.

No Drawing. Application July 18, 1934, Serial No. 735,826

6 Claims. (Cl. 106—36.1)

This invention relates to coloring agents for glass, glazes, and enamels, and to methods of employing such coloring agents; and consists in new compositions and new methods of use, in consequence of which color of substantially permanent depth of hue is given to the glass as it comes from the melting-pot, and no subsequent heating step is requisite to make the coloring agent effective. This application is in part a continuation of an application filed by me January 18, 1933, Serial No. 652,412.

In the art of making ruby glass, it is best to use a glass batch which contains zinc oxide as a complete or partial substitute for the lime commonly employed in glass-making; and to use pearl-ash as a complete or partial substitute for the soda-ash commonly employed. Selenium is added to this batch, either in one of the allotropic forms of the element (commonly the black variety), or in the form of the selenite of sodium or barium, together with cadmium sulphide. Oxidizing agents, such as nitre, are avoided; reducing agents, such as carbon or a carbon compound (like sugar or tartaric acid), arsenic trioxide, or antimony trioxide, or the element sulphur, are ordinarily employed, together with the selenium and the cadmium sulphide.

These glasses vary, as taken from the pot, from a colorless product, through yellow, to amber; and they strike red only when, after the gather has first been cooled, they are reheated.

I have found that, with the use of selenium and cadmium sulphide as the essential coloring agents, the addition of elemental cadmium will, without the addition of other reducing agents, have the effect that the glass obtained is red as it comes from the pot, and requires no reheating to bring out the color. I have also found that, with the addition of cadmium selenide to the usual selenium-cadmium sulphide batch, and without the use of other reducing agents, a glass is obtained which is red in the pot. I have further found that, with the addition of cadmium selenide to cadmium sulphide, and without other reducing agents, a glass is obtained which is red in the pot. Experiment further indicates that in any of the procedures indicated above free sulphur may be employed instead of combined sulphur, and free selenium instead of combined selenium, and free cadmium instead of combined cadmium; and that in all of these instances the glass is red after the gather from the pot has cooled. Thus the necessity is obviated of striking by reheating (as is the common practice) to produce the red color.

Glasses covered by my invention have the added advantage that they darken but slightly, if at all, on reheating, thus assuring constancy of color tone.

In the present commercial practice, in which striking or reheating is necessary to bring out the red color, the degree of temperature and the period of heating are factors which in their variability are determinative of the depth of color; and, because of this, skill and experience are required on the part of the operator who manufactures red ware. This delicacy or sensitivity in the ordinary practice is in my invention advantageously avoided. In the practice of my invention, by way of contrast, a glass is produced which practically carries its maximum color intensity as it is gathered from the pot, or which darkens but slightly on heat treatment during further manipulation, or in the cracking-off of the ware and in the finishing of sharp edges in a flame.

In exemplification of procedure, I may use a batch which will yield a glass of the molecular composition $Na_2O:ZnO:4SiO_2$; and to the batch I add a coloring agent that includes, in addition to the usual cadmium sulphide (with or without selenium), additional cadmium, either in elemental condition or in the form of cadmium selenide or both, according to and in the molecular proportions indicated in the formulæ, $CdS:CdSe:Cd$, or $CdS:Se:Cd$; and I make this addition to the batch in the ratio of 1-2% by weight of finished glass.

In the foundation glass the $SiO_2$ may be replaced in part by $B_2O_3$; the $ZnO$, in part by $CaO$; the $Na_2O$, in part by $K_2O$; and, of course, such minor modifications may be made as are common to glass-house practice for the manufacturer of selenium-red glasses.

While the invention renders possible the direct manufacture of ruby glass, without the addition of reducing agents, other than those mentioned in the foregoing description of the preferred practice, the addition of some or all of the usual reducing agents will not interfere with the direct color production that characterizes the invention. The invention would, therefore, permit of the use of these reducing agents, though they are not necessary. The color produced is to be attributed to the use, in association with the usual cadmium sulphide, with or without selenium, of cadmium selenide or elemental cadmium or both, with or without such other substances as are now commonly employed in the manufacture of selenium-red glass.

In practicing the invention, variation in the percentage in which the pigment is added to the batch will effect variation in the shade or color, and accordingly the color may be caused to range from yellow, through orange, pink, red, garnet, and even to black. The invention, involving the use of cadmium selenide or elemental cadmium, permits variation in percentages to effect such variations in shade, or of color intensity.

In the practice of the invention, instead of adding cadmium selenide or elemental cadmium to the coloring agent commonly employed, the elements cadmium, selenium, and sulphur in appropriate proportions may be directly combined with each other, with the formation either of a pure compound or of solid solutions. Such substances have been prepared, and have been found to be effective in producing in the glass a ruby color direct from the pot.

The element tellurium may be substituted in part for the selenium in the above-mentioned preparations, with the effect of producing various modifications of the color in the range already indicated.

It is well known to chemists that arsenic, antimony, bismuth, and phosphorus (Family B, Group 5) may partly or wholly replace elements (oxygen, sulphur, selenium, and tellurium) in Family B, Group 6, of the Mendelejeff periodic table of the elements, in their compounds. Sulphur may in turn partly or wholly replace selenium and tellurium. Again, the sulphur might be introduced as ZnS or some other metallic sulphide. It will be understood, therefore, that, without departing from the spirit of the invention, substitutions of such sort may be made in the compounding of the coloring agent, within the knowledge of one skilled in the art.

In some glass plants aluminum in the form of hydrate, or in the form of an aluminum-bearing natural mineral, such as cryolite or feldspar, is used in substitution for all or for part of the ZnO or other oxides commonly employed in zinc glasses, for the production of selenium-colored ware. Lead compounds also are substituted for zinc, wholly or in part, especially for the production of amber glasses. Some of these glasses are opal or alabaster; others crystal or clear. It will be understood that these and all such variations in the compounding of the batch are within my contemplation. The invention lies in the coloring of the glass, compounded with such range of variation as here is indicated, and consists in adding to the batch a coloring agent consisting essentially of cadmium sulphide, with or without selenium, and having combined with it or added to it an excess of cadmium, introduced either in elemental condition, or in the form of selenide of cadmium, or as cadmium sulphoselenide, either or all.

As has already been intimated, the art knows the use of cadmium sulphide with or without selenium as a glass-coloring agent. In certain of the ensuing claims, I employ the term "cadmium sulphide preparation" as inclusive of that which, as has just been stated, the art knows, namely, a coloring agent that consists of cadmium sulphide with or without selenium.

Indeed, I have found that cadmium sulphoselenide together with metallic cadmium, added to the glass batch in proper ratios both of the individual substances to one another and of the combined substances to the batch itself, will be effective, even in the absence of the usual coloring agents (a preparation of cadmium sulphide with metallic selenium), to afford not merely the desired red color, but to afford it to the glass in the pot, so that no subsequent heat treatment is required to bring out the color.

Enamels and glazes are prepared with coloring agents used for glass. Such novelty as applies to glass in this application shall also be construed as applying to enamels and glazes.

I claim as my invention:

1. A coloring agent for a glass batch which consists of the usual cadmium sulphide preparation, and an addition thereto of material from a group that consists of metallic cadmium, cadmium selenide, and cadmium sulpho-selenide, by the use of which the necessity is avoided of including other reducing agents in the addition to be made to the batch in the glass-melting pot, and the ultimate color is given to the glass while still in the pot and the necessity of reheating to bring out the color is avoided.

2. A coloring agent for a glass batch consisting of a mixture of two previously prepared components, cadmium sulpho-selenide and metallic cadmium.

3. A coloring agent for a glass batch which consists of the usual cadmium sulphide preparation, and an addition thereto of previously prepared cadmium sulpho-selenide, by the use of which the necessity is avoided of including other reducing agents in the addition to be made to the batch in the glass-melting pot, and the ultimate color is given to the glass while still in the pot and the necessity of reheating to bring out the color is avoided.

4. The method herein described of preparing glasses that range in color from yellow through orange pink red garnet and even to black and which are colored with cadmium sulphide preparation, and of giving to such glasses substantially their ultimate color while still in the glass-melting pot, and avoiding the necessity of skilled work in developing the desired color by reheating, which consists in melting the glass-forming components in the pot together with the usual cadmium sulphide preparation and in addition thereto a material from a group that consists of metallic cadmium, cadmium selenide, and cadmium sulpho-selenide.

5. The method herein described of preparing red glass which consists in melting the glass-forming components in the pot together with previously prepared cadmium sulpho-selenide and previously prepared metallic cadmium.

6. The method herein described of preparing red glass which consists in melting the glass-forming components in the pot together with previously prepared cadmium sulphide preparation and with previously prepared cadmium sulpho-selenide.

ALEXANDER SILVERMAN.